United States Patent
Shim et al.

(10) Patent No.: US 6,373,535 B1
(45) Date of Patent: Apr. 16, 2002

(54) APPARATUS AND METHOD FOR ADJUSTING CONVERGENCE UTILIZING SPINE INTERPOLATION

(75) Inventors: Jae-Seung Shim, Seoul; Jae-Seoung Sung, Suwon, both of (KR)

(73) Assignee: Samsun Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/641,969

(22) Filed: Aug. 21, 2000

(30) Foreign Application Priority Data

Aug. 21, 1999 (KR) ............................................. 99-34763

(51) Int. Cl.[7] ............................. H04N 3/22; H04N 3/26; H04N 9/28
(52) U.S. Cl. ..................... 348/745; 348/745; 348/806; 315/368.13
(58) Field of Search ................................. 348/745, 746, 348/747, 806–807; 315/368.13–368.11, 368.12

(56) References Cited

U.S. PATENT DOCUMENTS

| | | | | |
|---|---|---|---|---|
| 4,871,948 A | * | 10/1989 | Nelson | 315/368 |
| 5,016,095 A | * | 5/1991 | Kii | 358/64 |
| 5,274,307 A | * | 12/1993 | Christensen | 315/368.13 |
| 5,341,174 A | * | 8/1994 | Xue et al. | 348/576 |
| 5,345,280 A | * | 9/1994 | Kimura et al. | 348/745 |
| 5,382,984 A | * | 1/1995 | Tsujihara et al. | 346/746 |
| 5,696,848 A | * | 12/1997 | Pattie et al. | 382/254 |
| 5,739,870 A | * | 4/1998 | Simpson | 348/628 |
| 5,809,213 A | * | 9/1998 | Bhattacharjya | 395/106 |
| 6,108,054 A | * | 8/2000 | Heizmann et al. | 348/745 |

FOREIGN PATENT DOCUMENTS

EP 464806 * 1/1992

* cited by examiner

*Primary Examiner*—Michael Lee
*Assistant Examiner*—Brian Yenke
(74) *Attorney, Agent, or Firm*—Sughrue Mion, PLLC

(57) ABSTRACT

There is provided a convergence adjusting apparatus and method using spline interpolation in a projection image display device. In the convergence adjusting apparatus, a controller calculates the unknown coefficients of a cubic spline interpolation polynomial for each line segment separated by adjustment points on a horizontal or vertical line to interpolate between the adjustment points, a memory temporarily stores the unknown coefficients, a coordinate position generator counts horizontal sync signal pulses and calculates the square and cube of the count value, a plurality of multipliers multiply the count value, the square, and the cube by the unknown coefficients received from the memory, respectively, and an adder adds convergence adjustment point data received from the memory and the outputs of the multipliers and outputs interpolation values.

4 Claims, 5 Drawing Sheets

APPARATUS AND METHOD FOR ADJUSTING CONVERGENCE UTILIZING SPINE INTERPOLATION

FIELD OF THE BACKGROUND

This application claims priority to an application entitled "Apparatus and Method for Adjusting Convergence Utilizing Spline Interpolation" filed in the Korean Industrial Property Office on Aug. 21, 1999 and assigned Ser. No. 99-34763, the contents of which are hereby incorporated by reference.

BACKGROUND OF THE INVENTION

1. Field of the Invention

The present invention relates generally to a projection image display device, and in particular, to an apparatus and method for adjusting convergence utilizing spline interpolation.

2. Description of the Related Art

There is an increasing demand for large size and high quality in image devices. Because it is difficult to fabricate a large image device in a direct view display scheme, a projection scheme has been introduced as a solution. Convergence is a very significant factor in determining the quality and product yield of a projection TV, especially a CRT (Cathode Ray Tube) projection TV.

The current real time digital convergence system uses a fourth-order Lagrange polynomial with 5×5 seed data to achieve horizontal and vertical lines by interpolation. The reason for using the fourth-order function is that the CRT surface of a projection TV is made non-spherical to increase illumination efficiency, as shown in FIG. 1. To make smooth curvature out of the surface of the CRT, five points with brusque curvature changes are selected as seed points (a) and subjected to convergence adjustment in a fourth-order Lagrange interpolation polynomial. FIG. 1 illustrates an example of a horizontal CRT non-spherical surface and seed/non-seed data ((a)/(b)) and FIG. 2 is a point connection state diagram referred to for describing the influence of a variation in convergence data at a seed point (c) on convergence data at other seed points. FIG. 3 is an exemplary graph obtained by a Lagrange interpolation and FIG. 4 is a graph showing variations in convergence data at other seed points caused by the variation of convergence data at one specific seed point in Lagrange interpolation.

One of the benefits of using the fourth-order Lagrange interpolation polynomial is that density modulation does not occur at seed points 3, 6, 9, 12, and 15 in FIG. 1. Another benefit is that a look-up table is utilized instead of complicated hardware in calculating coefficients of the Lagrange polynomial, thereby facilitating simplification of hardware and enabling real time processing.

However, the fourth-order Lagrange interpolation polynomial has the distinctive drawback that adjustment of convergence data at one seed point influences convergence data at other seed points. For example, if convergence data at point 9 on a first horizontal line is adjusted to (c), convergence data at its adjacent points are also changed in FIG. 2. While one line only is shown to be influenced in FIG. 2, all data in horizontal and vertical lines are changed at worst and, as a result, the whole image may be changed. Furthermore, density modulation may take place at end seed points 3 and 15 due to external points 1, 2, an obtained by piecewise linear interpolation in the horizontal direction instead of Lagrange interpolation.

In a general fourth-order Lagrange interpolation polynomial-using system, adjustment of convergence data at one point leads to a change in convergence data at other points, as shown in FIGS. 3 and 4. Therefore, a multi-step operation is required for convergence adjustment.

SUMMARY OF THE INVENTION

It is, therefore, an object of the present invention to provide a convergence adjustment apparatus and method which can solve the above-described problems encountered in using a fourth-order Lagrange interpolation polynomial, by use of cubic spline interpolation.

It is another object of the present invention to provide a convergence adjustment apparatus and method in which cubic spline interpolation is used in multiple steps in order to facilitate convergence adjustment.

It is a further object of the present invention to provide a convergence adjustment apparatus and method in which convergence at an intended adjustment point is efficiently adjusted and continuity between the adjusted point and its adjacent point is maintained as well.

The above objects can be achieved by providing a convergence adjusting apparatus and method using spline interpolation in a projection image display device. In the convergence adjusting apparatus, a controller calculates the unknown coefficients of a cubic spline interpolation polynomial for each line segment separated by adjustment points on a horizontal or vertical line to interpolate between the adjustment points, a memory temporarily stores the unknown coefficients, a coordinate position generator counts horizontal sync signal pulses and calculates the square and cube of the count value, a plurality of multipliers multiply the count value, the square, and the cube by the unknown coefficients received from the memory, respectively, and an adder adds convergence adjustment point data received from the memory and the outputs of the multipliers and outputs interpolation values.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
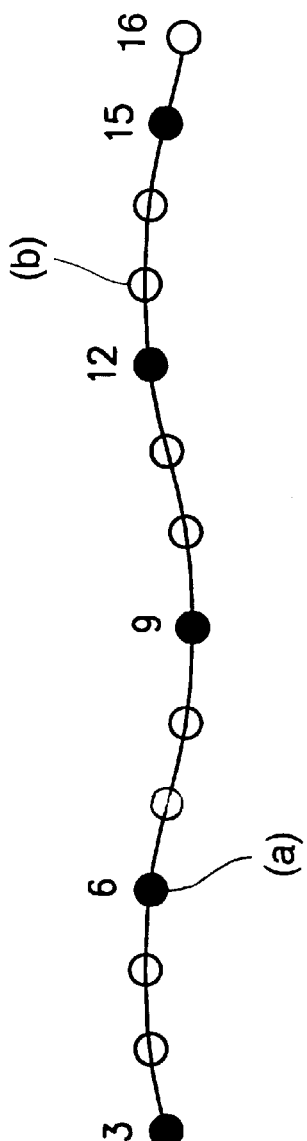
FIG. 1 illustrates an example of a non-spherical CRT surface in a horizontal direction and seed/non-seed data.
Figure 2:
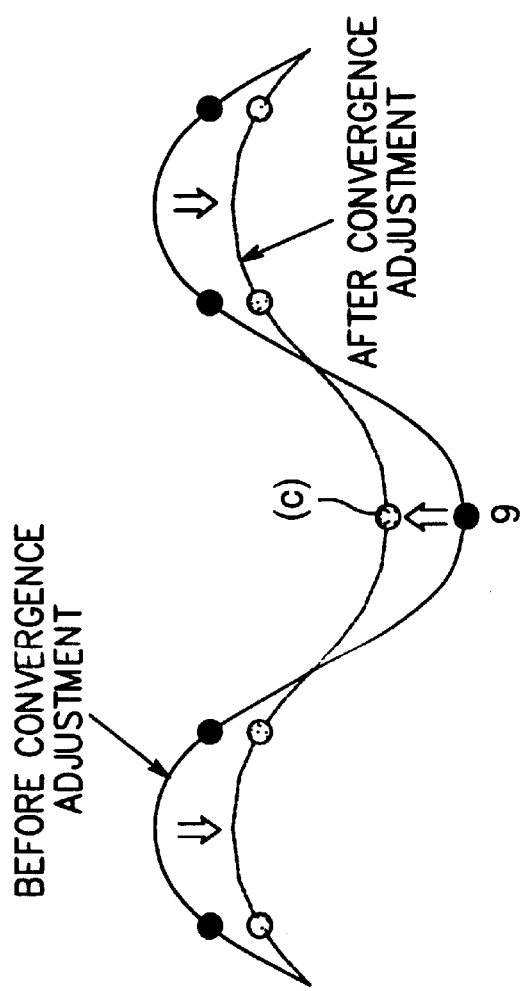
FIG. 2 is a point connection state diagram referred to for describing the influence of adjustment of convergence data at one seed point on convergence data at other seed points.
Figure 3:
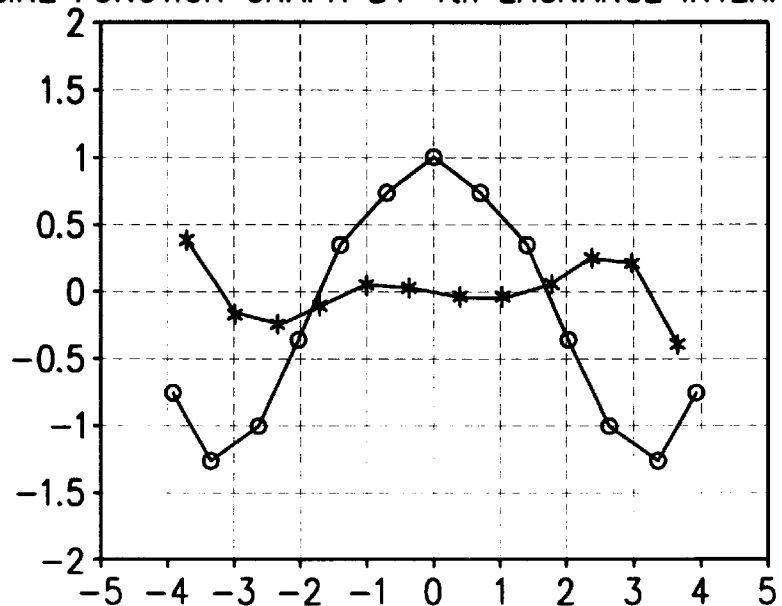
FIG. 3 illustrates an example of variations in the slope of a curve obtained by Lagrange interpolation.
Figure 4:
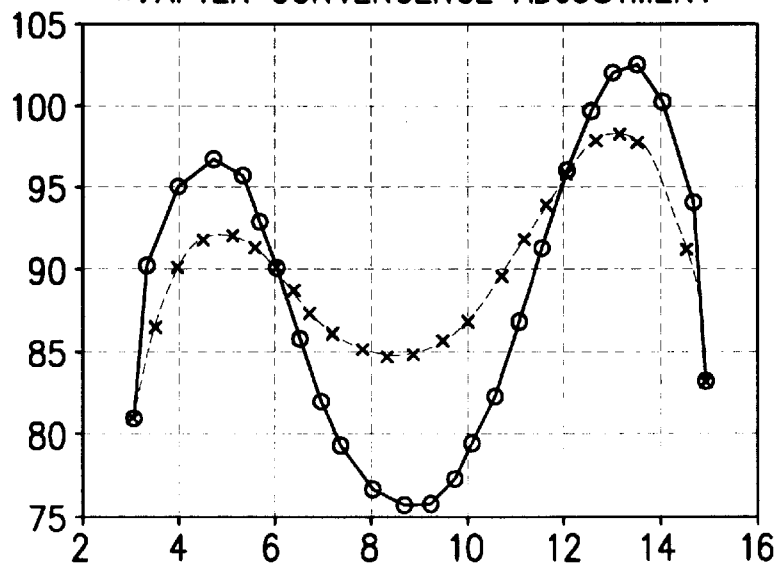
FIG. 4 is a graph showing variations in convergence data at other points caused by adjustment of convergence data at one point in Lagrange interpolation.

A preferred embodiment of the present invention will be described hereinbelow with reference to the accompanying drawings. In the following description, well-known functions or constructions are not described in detail since they would obscure the invention in unnecessary detail.

For better understanding of the present invention, spline interpolation will be described in brief. In case multiple points on a coordinate plane may be on a single curve, if Lagrange interpolation or Newton interpolation is applied to given points, an interpolation polynomial of a higher degree increases errors. To solve the problem cubic spline interpolation as well known is used.

According to the cubic spline interpolation, $a \leq x \leq b$ is divided into $a=x_0<x_1< \ldots <x_n=b$ and a third-order polynomial is used between two adjacent coordinate points on each line segment. The third-order polynomial has four unknown coefficients, two of the coefficients can be obtained only if the third-order polynomial passes through two points, and the other two coefficients can be obtained when first and second differential values of the polynomial are connected at two given points.

The cubic spline interpolation polynomial can be simplified in the following way.

When a function $f(x)$ is defined for $a \leq x \leq b$ and an approximation to $g(x)$, $a=x_0<x_1< \ldots <x_n=b$ and a third-order polynomial $P_j(x)$ satisfies:

(Requirement 1)

$$g(x_0)=f(x_0)=f_0, g(x_1)=f(x_1)=f_1, \ldots g(x_n)=f(x_n)=f_n \quad (1)$$

(Requirement 2)

$$g'(x_0)=k_0, g'(x_n)=k_n \quad (2)$$

where $k_0$ and $k_n$ are calculated later.

Then, the third polynomial function $P_j(x)$ is expressed as $$P_j(x)=a_{j0}+a_{j1}(x-x_j)+a_{j2}(x-x_j)^2+a_{j3}(x-x_j)^3 \quad (3)$$

and the coefficients of $P_j(x)$ are calculated by $$k(j-1)+4kj+k(j+1)=3/h(f(j+1)-f(j-1)),$$

$$j=1, \ldots, n-1 \text{ (n: the number of intervals)} \quad (4)$$

$$a_{j0}=P(x_j)=f_j,$$

$$a_{j1}=P'(x_j)=k_j,$$

$$a_{j2}=\tfrac{1}{2}P''_j(x_j)=3/h+hu\ 2(f_{j+1}-f_j)-(1/h(k_{j+1}+2k_j))$$

$$a_{j3}=\tfrac{1}{6}P'''_j(x_j)=3/h+hu\ 3(f_j-f_{j-1})-(1/h+hu\ 2(k_{j+1}+k_j)) \quad (5)$$

In Equation (5), $a_{j0}$ is a function value at an adjustment point and $a_{j1}$ is the slope at the intended point, obtained in Equation (4). Further, $a_{j0}$ and $a_{j1}$ will be termed $Y_0$ and $K_1$ hereinbelow. The other unknown coefficients $a_{j0}$ and $a_{j1}$, which can be calculated if the function value and the slope are given, are termed $A_{12}$ and $A_{13}$, respectively. In Equation (5), h is assumed to the interval between adjacent points and the same between any pair of adjacent points. Equations (4) and (5) are simplified to left and right functions respectively, given by $$f(L)=Y_0 K_0 X_1+A_{02}X_1^2+A_{03}X_1^3 \quad (6)$$

$$f(R)=Y_1+K_1(M-X_1)+A_{12}(M-X_1)^2+A_{13}(M-X_1)^3 \quad (7)$$

When the coefficients of cubic spline interpolation polynomials for each of consecutive points are calculated only in one direction, two functions are not necessary for one starting point and a whole function can be made by connecting one-directional piecewise functions. A cubic spline interpolation polynomial in this sense is $$f(x)=Y_0+K_1X+A_{12}X^2+A_{13}X^3 \quad (8)$$

Figure 5:
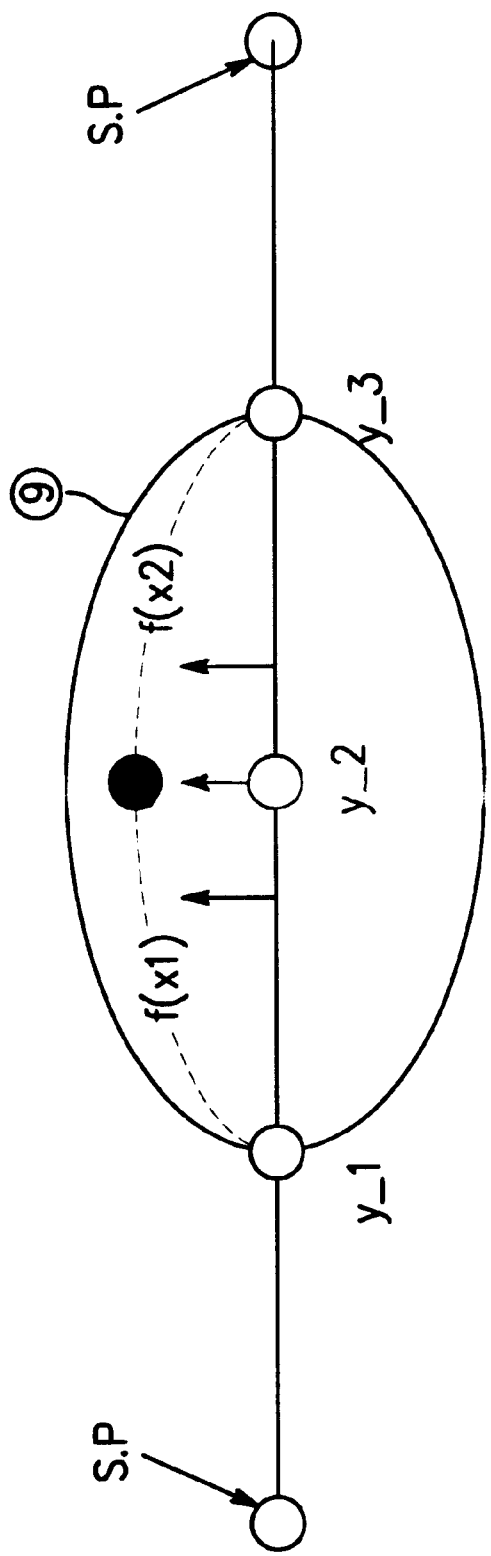
FIG. 5 illustrates an example of application of a cubic spline interpolation function according to an embodiment of the present invention.

Hardware can be further simplified using the cubic spline interpolation polynomial of Equation (8) than using the fourth-order Lagrange polynomial. In addition, adjustment of convergence data at a specific point has no influence on convergence data at other points. Therefore, the cubic spline interpolation polynomial can be implemented in hardware as shown in FIG. 5 and a Central Processing Unit (CPU) 100 calculates the unknown coefficients $Y_0$, $K_1$, $A_{12}$, and $A_{13}$ of the cubic spline interpolation polynomial for convergence adjustment.

However, although adjustment of convergence data at one point has no influence on convergence data at other points in application of the cubic spline interpolation polynomial, further adjustment of convergence data at its adjacent point influences the slope. Accordingly, when the adjacent point is later selected for convergence adjustment, a curve by interpolation is much changed prior to convergence adjustment of the adjacent point.

To overcome this problem, a multi-spline method is employed in the preferred embodiment of the present invention. Multi-spline interpolation refers to spline interpolation that is performed on a line segment including an intended adjustment point y and other adjacent line segments. For example, if a third point $y_{13}$ 2 is to be adjusted in four line segments separated by five points, primary interpolation is implemented between second and third points and between third and fourth points to change values between second and third line segments and then secondary interpolation is performed in such a way that the value between the first and fourth line segments is changed. By the use of the multi-spline interpolation scheme, the convergence of an intended line segment can be adjusted with minimum influence on the convergence of the whole image.

Now a description will be conducted of a convergence adjustment apparatus using spline interpolation and a method of calculating the unknown coefficients of a cubic spline interpolation polynomial using the multi-spline interpolation.

Figure 6:
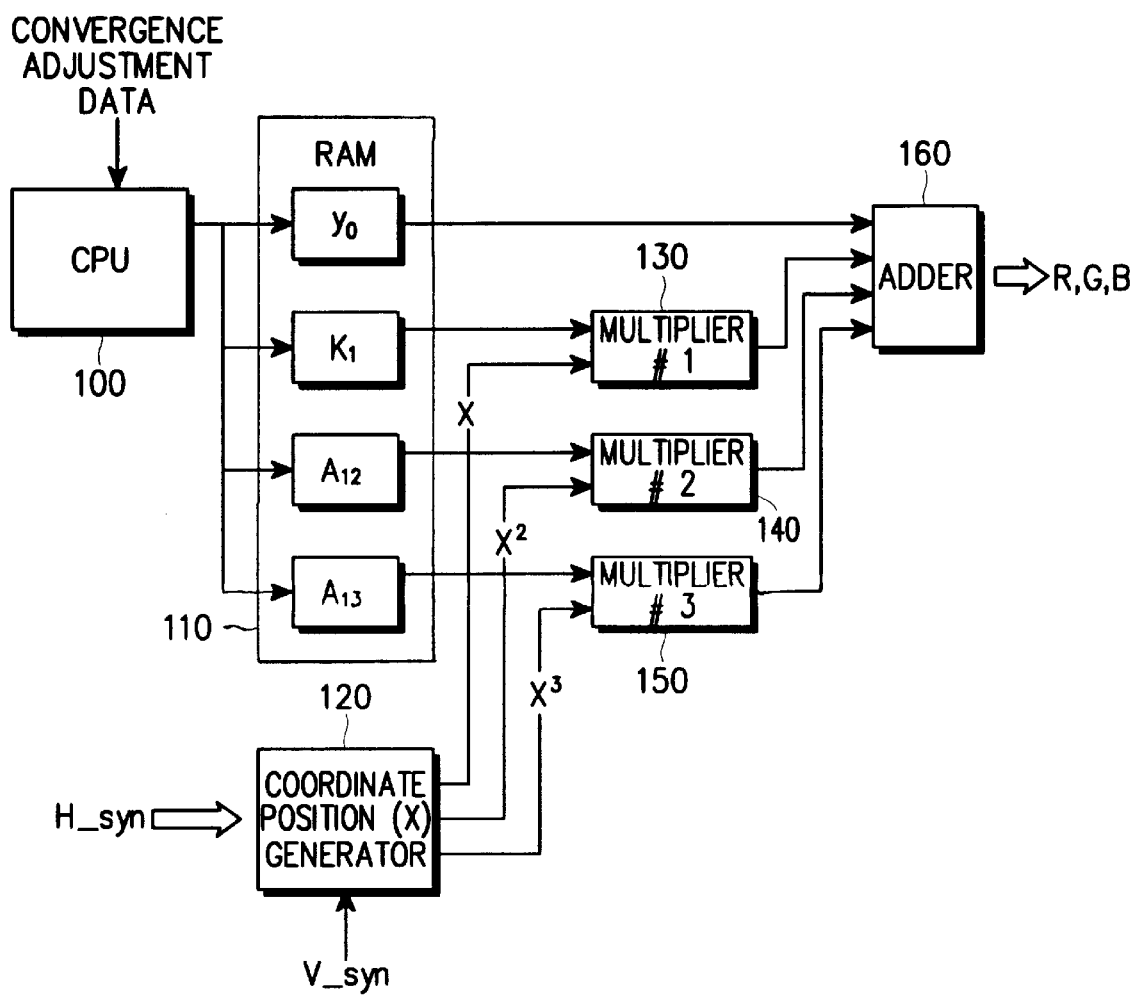
FIG. 6 is a block diagram of a convergence adjustment apparatus according to the embodiment of the present invention.
Figure 7:
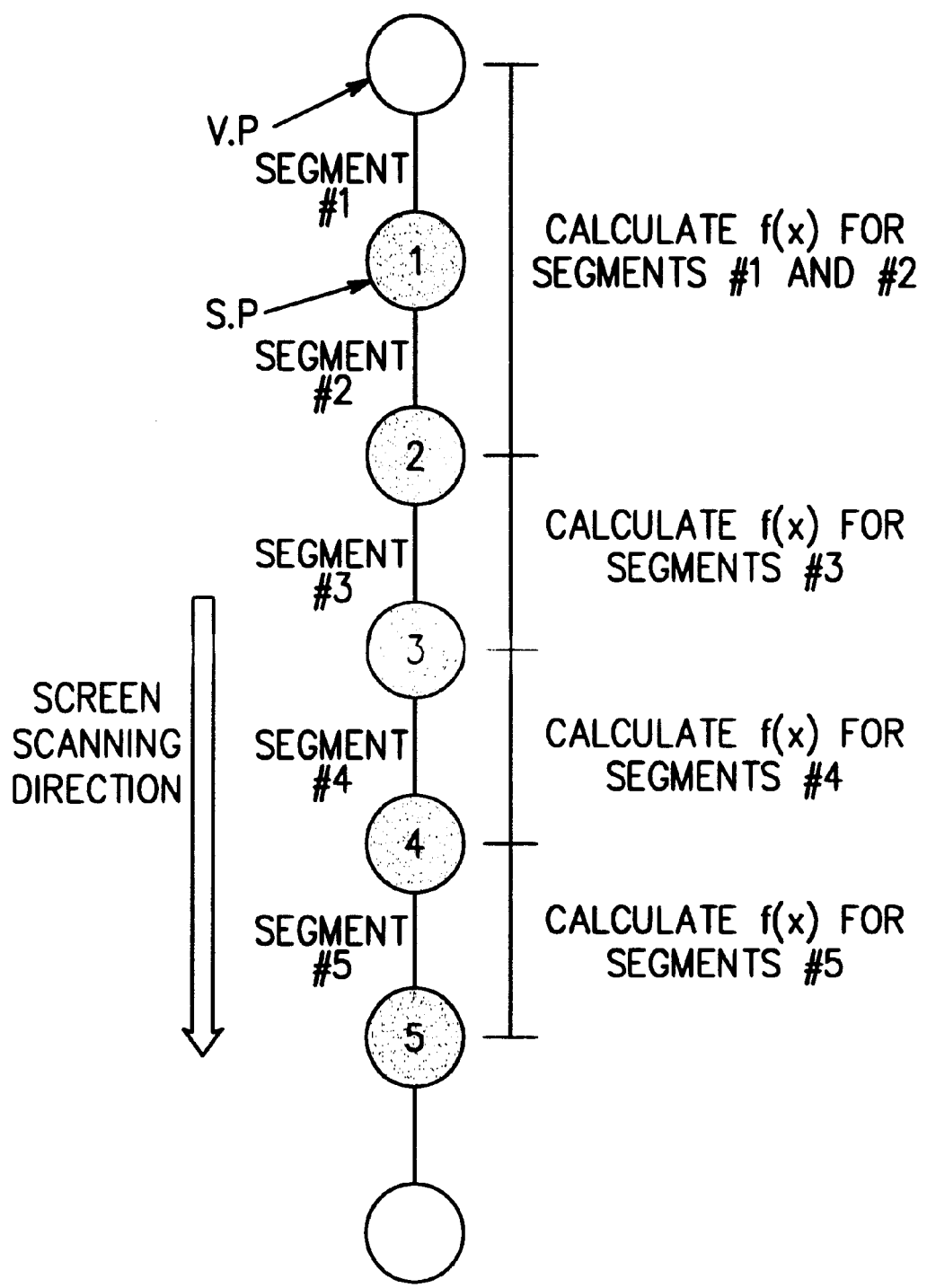
FIG. 7 is a flowchart illustrating a multi-spline interpolation procedure according to the embodiment of the present invention.

FIG. 6 is a block diagram of the convergence adjustment apparatus according to the preferred embodiment of the present invention and FIG. 7 is a flowchart illustrating the multi-spline interpolation procedure according to the preferred embodiment of the present invention.

Referring to FIG. 6, the convergence adjustment apparatus comprises a CPU 100, a Random Access Memory (RAM) 110, multipliers 130, 140, and 150, an adder 160, and a coordinate position (X) generator 120. The CPU 100 calculates the unknown coefficients $Y_0$, $K_1$, $A_{12}$, and $A_{13}$ of a cubic spline interpolation polynomial for each line segment defined by convergence adjustment points to interpolate between each pair of convergence adjustment points and stores the unknown coefficients $Y_0$, $K_1$, $A_{12}$, and $A_{13}$ in the RAM 110. Convergence adjustment data input to the CPU 100 has been changed by an operator. When convergence adjustment data for one adjustment point is input, the unknown coefficient $Y_0$ (function value) at the adjustment point is changed. The coordinate position generator 120 counts horizontal sync signal pulses H-syn and outputs the count of horizontal lines. The coordinate position generator 120 also generates the square of the horizontal line count and cube of the horizontal line count. The coordinate position generator 120 is reset by a vertical sync signal V-syn. The multipliers 130, 140, and 150 multiply the horizontal line count, the square of the horizontal line count, and the cube of the horizontal line count received from the coordinate position generator 120 by the unknown coefficients $K_1$, $A_{12}$, and $A_{13}$, respectively. The adder 160 adds the outputs of the RAM 110 and the multipliers 130, 140, and 150 and outputs interpolation data between adjustment points by the cube spline interpolation polynomial f(x). Referring to the interpolation data, current applied to a deflection coil of an R,G,B CRT is controlled for adjustment of R,G,B convergence.

Referring to FIG. 7, the CPU 100 calculates a value between a starting adjustment point S.P among five convergence adjustment points that form a vertical line and a virtual point V.P above the starting adjustment point and a value between the starting adjustment point and a second adjustment point below the first adjustment point, by the cube spline interpolation polynomial f(x). In this case, the unknown coefficients $Y_0$, $K_1$, $A_{12}$, and $A_{13}$ of cube spline interpolation polynomials f(x) for line segments #1 and #2 are calculated with convergence adjustment data in Equations (4) and (5). Then, the CPU 100 calculates a value between the second adjustment point and a third adjustment point below the second adjustment point by a cube spline interpolation polynomial f(x). The interpolation value between the first and second adjustment points is used as the interpolation value in line segment #2. A value between the third adjustment point and a fourth adjustment point below the third adjustment point is calculated by a cube spline interpolation polynomial f(x). That is, the CPU 100 calculates a single-directional function continuously without the need for using two functions for one point with respect to its adjacent points, so that piecewise functions are connected to one whole function on a vertical or horizontal line. Therefore, when the function value $Y_0$ of the third adjustment point is changed by input of convergence adjustment data, the interpolation values in line segments #3 and #4 and the interpolation values in line segments #2 and #5 are changed by the spline interpolation polynomials f(x).

Accordingly, the convergence of an intended line segment can be efficiently adjusted, having a minimum influence on the convergence of the entire image.

In accordance with the present invention as described above, the change of convergence data at points other than specific adjustment points is minimized by interpolating between adjustment points by spline interpolation for line segments including the adjustment points. Because the CPU performs spline interpolation calculations, the interpolation data between intended adjustment points can be obtained with simple hardware. Furthermore, only the convergence of an intended line segment can be adjusted with an influence on the convergence of the entire image minimized, by ensuring the continuity of a vertical or horizontal line.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A convergence adjusting apparatus in a projection image display device, comprising:

a controller for generating unknown coefficients of a cubic spline interpolation polynomial for each line segment separated by adjustment points on a horizontal or vertical line to interpolate between the adjustment points;

a memory for storing the unknown coefficients;

a coordinate position generator for counting horizontal sync signal pulses to generate a count value and generating the square of the count value and the cube of the count value;

a plurality of multipliers for multiplying the count value, the square of the count value, and the cube of the count value by the unknown coefficients received from the memory, respectively; and an adder for adding convergence adjustment point data received from the memory and the outputs of the multipliers and to generate interpolation values between the adjustment points.

2. The convergence adjusting apparatus of claim 1, wherein said coordinate position generator is reset by a vertical sync signal.

3. The convergence adjusting apparatus of claim 1, wherein the cubic spline interpolation polynomial is represented by the equation $f(x)=Y_0+K_1X+A_{12}X^2+A_{13}X^3$, where $Y_0$, $K_1$, $A_{12}$ and $A_{13}$ are the unknown coefficients and X is the count value.

4. A convergence adjusting method in a projection image display device, comprising the steps of:

(a) setting a specific adjustment point on a horizontal or vertical line as a starting point and calculating a value between the starting point and adjacent points using a cubic spline interpolation polynomial represented by the equation $f(x)=Y_0+K_1X+A_{12}X^2+A_{13}X^3$, where $Y_0$, $K_1$, $A_{12}$ and $A_{13}$ are unknown coefficients and X is a count value of horizontal sync signal pulses;

(b) setting one of the adjacent points as a next point and calculating a value between the next point and a point adjacent to the next point using the cubic spline interpolation polynomial; and (c) repeating the step (b) until cubic spline interpolation is performed between all adjustment points in one direction from the starting point, whereby convergence is adjusted on the horizontal or vertical line.

* * * * *